US009213605B2

United States Patent
Oyman (10) Patent No.: US 9,213,605 B2
(45) Date of Patent: Dec. 15, 2015

(54) IP MULTIMEDIA SUBSYSTEM AND METHOD FOR MBMS FILE REPAIR USING HTTP SERVERS

(75) Inventor: Ozgur Oyman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 317 days.

(21) Appl. No.: 13/613,902

(22) Filed: Sep. 13, 2012

(65) Prior Publication Data

US 2013/0246846 A1 Sep. 19, 2013

Related U.S. Application Data

(60) Provisional application No. 61/589,774, filed on Jan. 23, 2012.

(51) Int. Cl.
*G06F 11/00* (2006.01)
*G06F 11/14* (2006.01)
*H04W 4/06* (2009.01)
(Continued)

(52) U.S. Cl.
CPC ............ *G06F 11/1412* (2013.01); *H04L 67/02* (2013.01); *H04W 4/06* (2013.01); *H04W 80/10* (2013.01)

(58) Field of Classification Search
CPC ............ G06F 11/1443; G06F 11/1412; H04L 1/1809; H04L 1/1812; H04W 80/10
USPC .................................................. 714/18, 748
See application file for complete search history.

(56) References Cited

U.S. PATENT DOCUMENTS 7,296,205 B2 * 11/2007 Curcio et al. ................. 714/748
7,590,922 B2 * 9/2009 Vedantham et al. .......... 714/776
(Continued)

FOREIGN PATENT DOCUMENTS

CN 104067643 A 9/2014
EP 1926329 A1 5/2008
(Continued)

OTHER PUBLICATIONS

"IP Multimedia Subsystem (IMS) based Packet Switch Streaming (PSS) and Multimedia Broadcast/Multicast Service (MBMS) User Service; Protocols", 3GPP TS 26.237 V11.0.0, Release 11, (Jun. 2012), 142 pgs.

(Continued)

*Primary Examiner* — Philip Guyton
(74) *Attorney, Agent, or Firm* — Schwegman Lundberg & Woessner, P.A.

(57) ABSTRACT

Disclosed in some examples is a method of media repair in an IMS based network, the method includes communicating with an IMS network using SIP to setup a download session with a BMSC over a MBMS bearer; responsive to determining that one or more received encoding symbols of media downloaded using the established MBMS bearer cannot be decoded: requesting a file repair procedure from the IMS network component using a SIP re-invite request, the SIP re-invite request including an address of an HTTP repair server indicated by the IMS network component during the MBMS bearer setup; responsive to receiving a SIP acknowledgement indicating that the request was successful, requesting an HTTP connection with the HTTP server to re-download the one or more encoding symbols of the media that could not be decoded; and receiving the one or more encoding symbols from the HTTP server.

21 Claims, 8 Drawing Sheets

(51) Int. Cl.
*H04W 80/10* (2009.01)
*H04L 29/08* (2006.01)

(56) References Cited

U.S. PATENT DOCUMENTS

| | | | |
|---|---|---|---|
| 7,599,294 B2* | 10/2009 | Walsh et al. | 370/235 |
| 8,341,479 B2* | 12/2012 | Bichot et al. | 714/748 |
| 8,478,720 B2* | 7/2013 | Gautier et al. | 707/613 |
| 2006/0023732 A1 | 2/2006 | Vedantham et al. | |
| 2008/0307041 A1* | 12/2008 | Bouazizi et al. | 709/203 |
| 2008/0313191 A1* | 12/2008 | Bouazizi | 707/10 |
| 2009/0077247 A1* | 3/2009 | Bouazizi et al. | 709/229 |
| 2011/0067081 A1 | 3/2011 | Åström et al. | |
| 2013/0083795 A1* | 4/2013 | Kotecha | 370/390 |
| 2013/0246846 A1* | 9/2013 | Oyman | 714/18 |
| 2014/0095730 A1* | 4/2014 | Ozgur | 709/231 |

FOREIGN PATENT DOCUMENTS

| | | |
|---|---|---|
| JP | 2010081397 A | 4/2010 |
| KR | 1020090073097 A | 7/2009 |
| WO | WO 2013022470 A1 * | 2/2013 |
| WO | WO-2013112479 A1 | 8/2013 |

OTHER PUBLICATIONS

"IP Multimedia Subsystem (IMS); Stage 2", 3GPP TS 23.228 V11.6.0, (Sep. 2012), 290 pgs.
"Multimedia Broadcast/Multicast Service (MBMS); Protocols and codecs", 3GPP TS 26.346, V11.2.0, Release 11, (Sep. 2012), 158 pgs.
"Policy and Charging Control Architecture", 3GPP TS 23.203 V11.7.0, (Sep. 2012), 178 pgs.
"Technical Report; Enhancements to Multimedia (EMM): EMM, DDE and IPME Aspects", 3GPP TR 26.951, V1.0.0, Release 11, (Aug. 2012), 16 pgs.
"Transparent end-to-end Packet-switched Streaming Service (PSS): Protocols and codecs", 3GPP TS 23.234, V11.1.0, Release 11, (Sep. 2012), 172 pgs.
"International Application No. PCT/US2013/022571, International Preliminary Report on Patentability mailed Aug. 7, 2014", 7 pgs.
"International Application No. PCT/US2013/022571, International Search Report mailed May 15, 2013", 3 pgs.
"International Application No. PCT/US2013/022571, Written Opinion mailed May 15, 2013", 5 pgs.
3GPP, "TS 26.237 IP Multimedia Subsystem (IMS) based Packet Switch Streaming (PSS) and Multimedia Broadcast/Multicast Service (MBMS) User Service; Protocols (Release 11)".
3GPP, "TS 26.346 Multimedia Broadcast/Multicast Service (MBMS); Protocols and codecs (Release 11)".
"Japanese Application Serial No. 2014-553518, Office Action mailed Aug. 18, 2015", 5 pgs.
"3rd Generation Partnership Project; Technical Specification Group Services and System Aspects; IP Multimedia Subsystem (IMS) based Packet Switch Streaming (PSS) and Multimedia Broadcast/Multicast Service (MBMS) User Service; Protocols (Release 10)", Mobile Competence C Entre; 650, Route des Lucioles: F-06921 Sophia-Antipolis Cedex; France, vol. SA WG4, XP050550387, (Sep. 20, 2011).
"3rd Generation Partnership Project; Technical Specification Group Services and System Aspects; IP Multimedia Broadcast/Multicast Service (MBMS) User Service; Protocols (Release 10)", 3GPP TS 26.237 V10.3.0, (Sep. 2011).
"3rd Generation Partnership Project; Technical Specification Group Services and System Aspects; Multimedia Broadcast/Multicast Service (MBMS); Protocols and codecs (Release 10)", 3GPP TS 26.346 V10.2.0.
"Digital video Broadcasting (DVB); IP datacast over DVB-H: content delivery protocols", IEEE, LIS. Sophia an tipolis cedex, France, No. V1.2.1, XP002444556, (Dec. 1, 2006), 31-37.
"European Application Serial No. 13741599.8, Extended European Search Report mailed Oct. 2, 2015", 8 pgs.
"Korean Application Serial No. 10-2014-7023285, Office Action mailed Oct. 12, 2015", W/English Translation, 11 pgs.

* cited by examiner

IP MULTIMEDIA SUBSYSTEM AND METHOD FOR MBMS FILE REPAIR USING HTTP SERVERS

CLAIM OF PRIORITY

This patent application claims the benefit of priority, under 35 U.S.C. Section 119(e), to U.S. Provisional Patent Application Ser. No. 61/589,774, filed on Jan. 23, 2012, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Intel, Inc., All Rights Reserved.

BACKGROUND

Multimedia Broadcast Multicast Services (MBMS) is a point-to-multipoint system utilized on cellular networks operating in accordance with one of the cellular standards promulgated by the Third Generation Partnership Project (3GPP). It is designed for efficient delivery of popular content to many receivers based on broadcast and multicast techniques and was first introduced in release six of the 3GPP Universal Mobile Telecommunications System (UMTS) specification as an optional feature, and was further optimized in the later 3GPP releases based on several enhancements such as multicast broadcast single frequency network (MBSFN) functionality. At the service layer, MBMS also defines delivery protocols for both streaming of multimedia content and reliable download of files. MBMS has been adopted as the enhanced MBMS (eMBMS) mode in 3GPP-based Long Term Evolution (LTE) standards development corresponding to 3GPP releases eight and onwards.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Unlike unicast delivery, MBMS-based transmissions do not benefit from data recovery mechanisms based on retransmission of erroneously received data blocks, such as those based on automatic repeat request (ARQ) and hybrid automatic repeat request (HARQ) based on acknowledgement (ACK) and negative acknowledgment (NACK) signaling from the user equipment (UE) and consequently during data transmission to the user equipment (UE), data may be lost or corrupted. To increase the reliability of MBMS transmissions, application-layer forward error correction (AL-FEC) codes are used in addition to the traditional channel coding in order to (at least partially) recover packet erasures, with AL-FEC examples including Reed Solomon codes, Fountain codes and Raptor codes.

The IP Multimedia Subsystem or IP Multimedia Core Network Subsystem (IMS) is an architectural framework for delivering Internet Protocol (IP) multimedia services. IMS promises to enable rich blended services such as voice, video, data, and multimedia applications within a converged IP platform. Such services would simplify the communication and entertainment experience of users and create a value-based market for service providers. IMS intends to enable the creation of innovative personalized applications and the faster deployment of these applications. The IP multimedia core network subsystem is a collection of different core network and access network functions, linked by standardized interfaces, which grouped form one IMS administrative network. To ease the integration with the Internet, IMS uses the broadly adopted Session Initiation Protocol (SIP). Several roles of Session Initiation Protocol (SIP) servers or proxies, collectively called Call Session Control Function (CSCF), are used to process SIP signaling packets in the IMS. In 3GPP, IMS was first introduced during Release 5 into UMTS within its core network, and IMS support was further enhanced during the LTE standards development. It consists of specifications on the essential requirements and signaling for controlling multimedia sessions, including those for the protocols and procedures for establishing, managing and tearing down sessions for MBMS-based streaming and download services. Fixed access (e.g., Digital Subscriber Line (DSL), cable modems, Ethernet), mobile access, e.g., WCDMA, CDMA2000, GSM, GPRS, and wireless access, e.g. WLAN, WiMAX, are all supported in the IMS framework. Other phone systems like plain old telephone service (POTS—the old analogue telephones), H.323 and non IMS-compatible VoIP systems, are supported through gateway.

The file download delivery service over MBMS provides a file-repair feature that enables UEs that have not received enough symbols to properly decode a file to request additional symbols. This allows the network to deliver specific symbols to particular UEs over unicast bearers and not load broadcast bearers in the cases where the aggregate load needed to deliver symbols to particular UEs over unicast is moderate.

The file-repair feature relies on file-repair servers in the network to service the repair requests of UEs. The current architecture requires dedicated servers that are specially designed to service the UE requests. This approach can be costly and does not scale well with large deployments.

Figure 1:
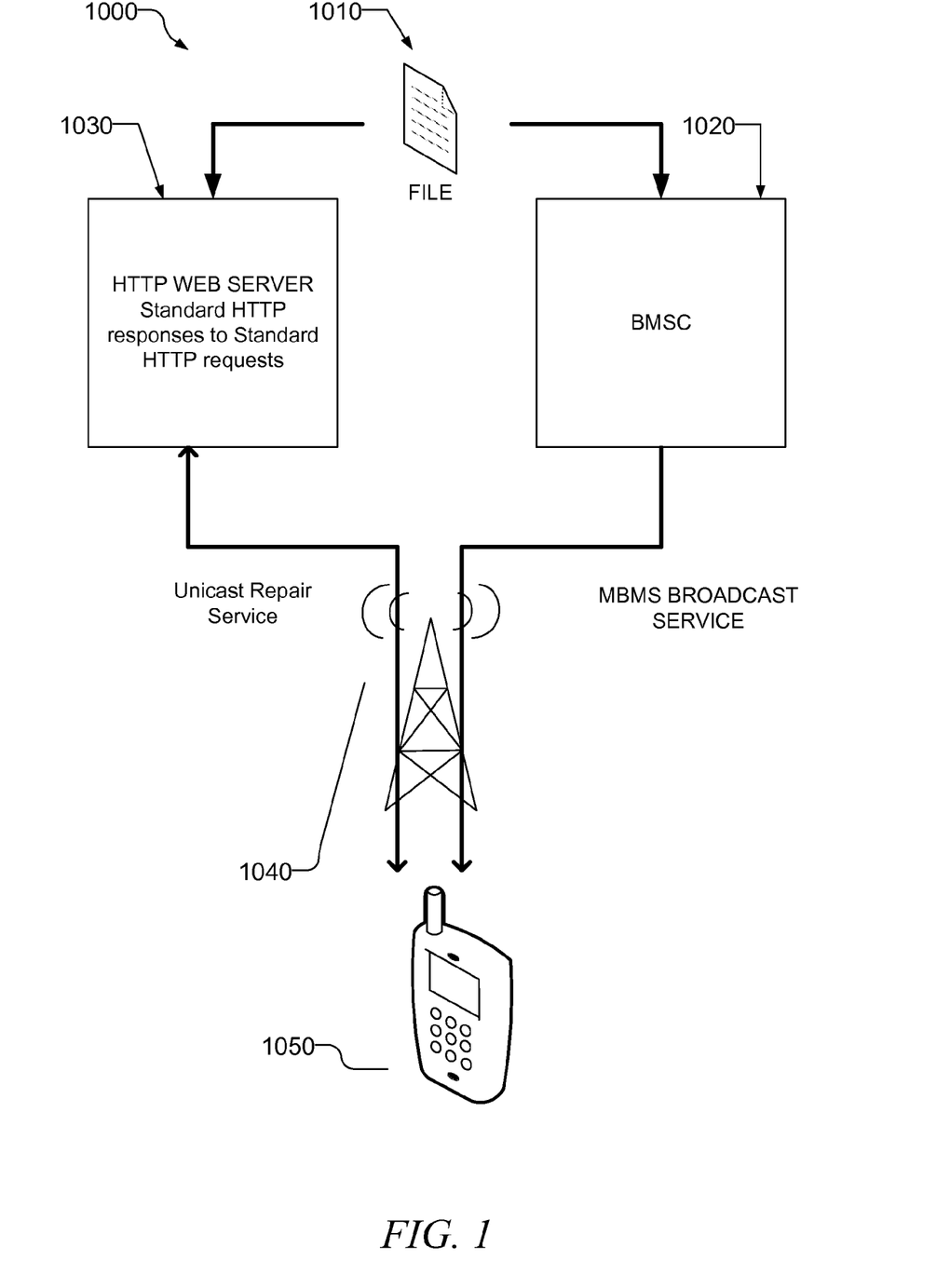
FIG. 1 shows a schematic of an example file-repair feature using an HTTP server according to some examples of the present disclosure.

An enhancement to the current file-repair feature that enables the use of conventional HyperText Transfer Protocol (HTTP) web servers 1030 to handle file-repair requests rather than rely on the broadcast multicast service center (BMSC) is shown in FIG. 1. The MBMS broadcast service provided by the BMSC 1020 transmits a file or other media 1010 to a user equipment (UE) over a cellular network 1040. For recovery of source symbols, the UE 1050 may contact an HTTP server 1030 using standardized HTTP requests/responses. This approach takes advantage of the existing, scalable, standardized and widely-deployed web-based infrastructure for the repair service. In some examples, the system may realize a good performance-complexity tradeoff in terms of server complexity, scalability, caching efficiency, and HTTP request overhead perspectives by intelligently performing repair symbol transmission over the MBMS (repair symbols are redundant symbols sent to the UE that allow the UE to repair the file without actually retransmitting the missing pieces of the file—e.g., symbols produced by an AL-FEC scheme) while allowing for recovery of source symbols by a limited number of HTTP requests. The operator does not have to use specialized file-repair servers and can use the same web servers used to deliver content. Therefore, the BMSC is no longer needed for file repair procedures which are now handled by HTTP servers. The HTTP servers only have to store the content and do not have to spend resources for FEC coding which will allow the system to achieve good cache and network efficiencies with low complexity which will allow the operator to leverage the scalability, reliability, and readily available content provided by using conventional web-servers in the network or Internet.

Disclosed in some examples are systems, methods, and machine-readable media which realize an MBMS file repair procedure over Internet Protocol Multimedia Subsystem (IMS)-based MBMS services. This involves modifications to the IMS-based MBMS download delivery method, in particular, to the associated recovery procedures following the initial broadcast of the file, e.g., after the File Delivery over Unidirectional Transport (FLUTE) session is received by the UE over MBMS bearers from the BMSC which broadcasted the file. If a correction is needed (i.e., the UE is unable to decode the file based on the correctly-received set of source and repair symbols), the UE disconnects from the BMSC and establishes a session switch to an HTTP web server in order to retrieve the missing components of the file using HTTP (rather than remaining connected to the BMSC for MBMS file repair service, which is currently the procedure).

Figure 2:
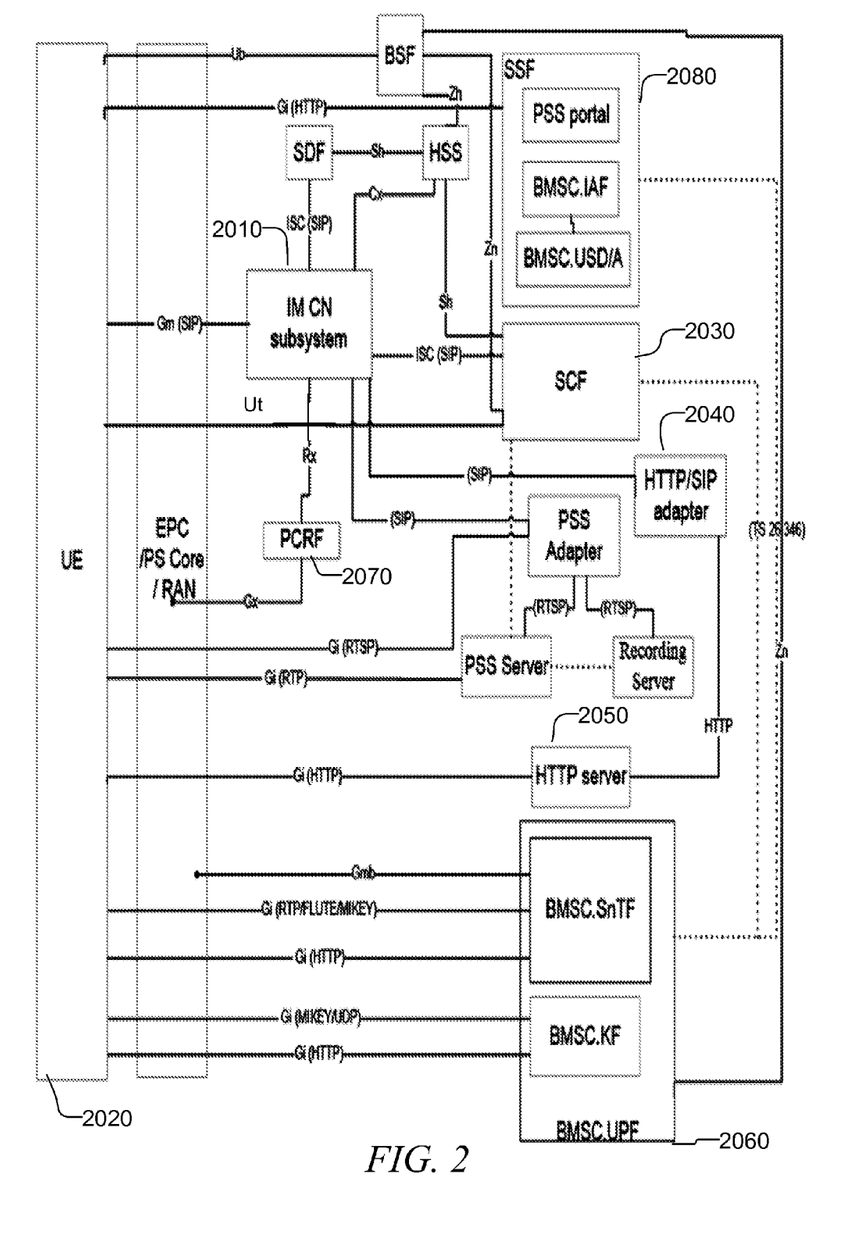
FIG. 2 shows a block diagram of components used to implement an IMS-based MBMS service according to some examples of the present disclosure.
Figure 3:
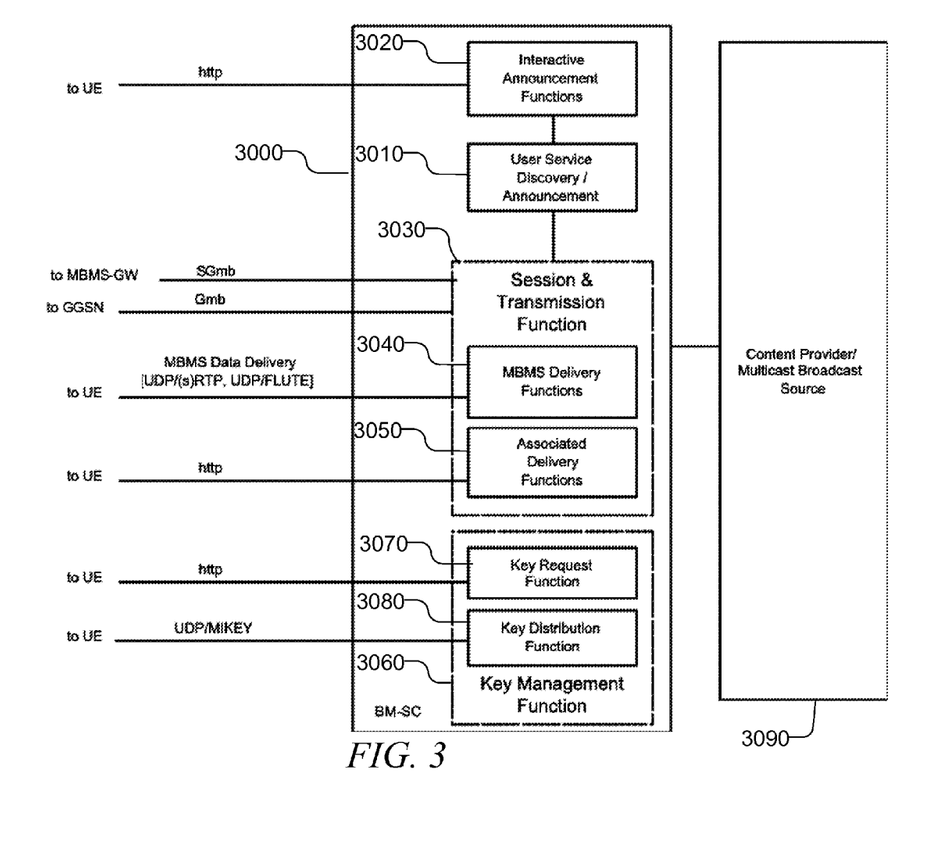
FIG. 3 shows a block diagram of a broadcast multicast service center (BMSC) according to some examples of the present disclosure.

FIG. 2 shows a number of functional blocks for the IMS-based MBMS service architecture as defined in 3GPP Technical Specification (TS) 26.237 (this diagram is based on a similar diagram in TS 26.237 and may also show additional IMS-based service functions that may not be relevant for an IMS-based MBMS service, such as the functional blocks related to packet-switched streaming (PSS)). IMS Core Network Subsystem 2010 (IM CN Subsystem) may be a subsystem at least partially defined in 3GPP Technical Specification (TS) 23.228 and which supports user registration and authentication, mobility and roaming, control of multimedia sessions, QoS control, policy control, charging, and interworking with circuit switched networks. UE 2020 contains the IMS-based MBMS client functionality, which performs service discovery and selection, handles service initiation, modification and termination, receives, and presents the content to the user. The Service Control Function (SCF) 2030 provides service logic and functions required to support execution of such logic. It does service authorization during session initiation and session modification, which includes checking the MBMS user's service subscription in order to allow or deny access to the service and it selects the relevant MBMS media functions. For HTTP-based delivery, the SCF acts as a proxy or back-to-back user agent (B2BUA). For MBMS, the SCF acts as a terminating user agent (UA). HTTP/SIP adapter 2040 correlates SIP sessions with HTTP incoming requests. HTTP server 2050 is described in 3GPP TS 26.234, and may provide source symbols upon request for file repairs using standard HTTP protocols. BMSC.UPF 2060 handles all broadcast multicast service center (BMSC) user plane sub-functions (UPF). FIG. 3 illustrates the BMSC sub-functional architecture and associated interfaces between the UE and BMSC, according to 3GPP TS 26.346. Policy and Charging Rules Function (PCRF) 2070 as specified in 3GPP TS 23.203, controls the charging and the establishment of resources in the Radio Access Network (RAN) and Packet Switched (PS) core network. Service Selection Function (SSF) 2080 provides a list of available user services, including HTTP-based Dynamic Adaptive Streaming over HTTP (DASH), MBMS User Services, and relevant user service description information. The list can also be personalized to the client's identity.

FIG. 2 is intended to be an example of a functional schematic of a particular example IMS-based MBMS system (while also showing the UE, the Evolved Packet Core (EPC), and the radio access network or RAN). One skilled in the art with the benefit of Applicants' disclosure will realize that various combinations and permutations of functional groupings may be used to implement the various examples herein disclosed. For example, multiple components may be executed in the same location and/or on the same physical hardware.

Turning now to FIG. 3, a block diagram 3000 of a BMSC is shown. User Service Discovery and Announcement 3010 provides announcements to UEs through a response to an HTTP request sent by the UE (facilitated by the interactive announcement functions 3020), through service announcements using MBMS bearers (facilitated through the MBMS Delivery functions 3040 of the Session and Transmit Function 3030) or through Push announcements using MBMS Push capabilities. These announcements contain the necessary information for a UE to receive the announced services. The announcements may include service identifiers, IP multicast addresses, and media descriptions.

The session and transmission function 3030 includes all content transmission related functions. MBMS delivery functions 3040 deliver files (via the MBMS download services) or streams (via the MBMS streaming service). The session and transmission function 3030 communicates with the UE over UDP and real-time transmission protocol (RTP) as well as File Delivery over Unidirectional Transport (FLUTE). Associated delivery functions 3050 include auxiliary procedures such as file repair procedures.

Key Management Function 3060 includes key request functions 3070 and key distribution functions 3080 which handle authentication and key distribution to the UE. Content Provider/Multicast Broadcast Source 3090 is a content provider's network that provides the content which is broadcast or multicast over the MBMS network.

Figure 4:
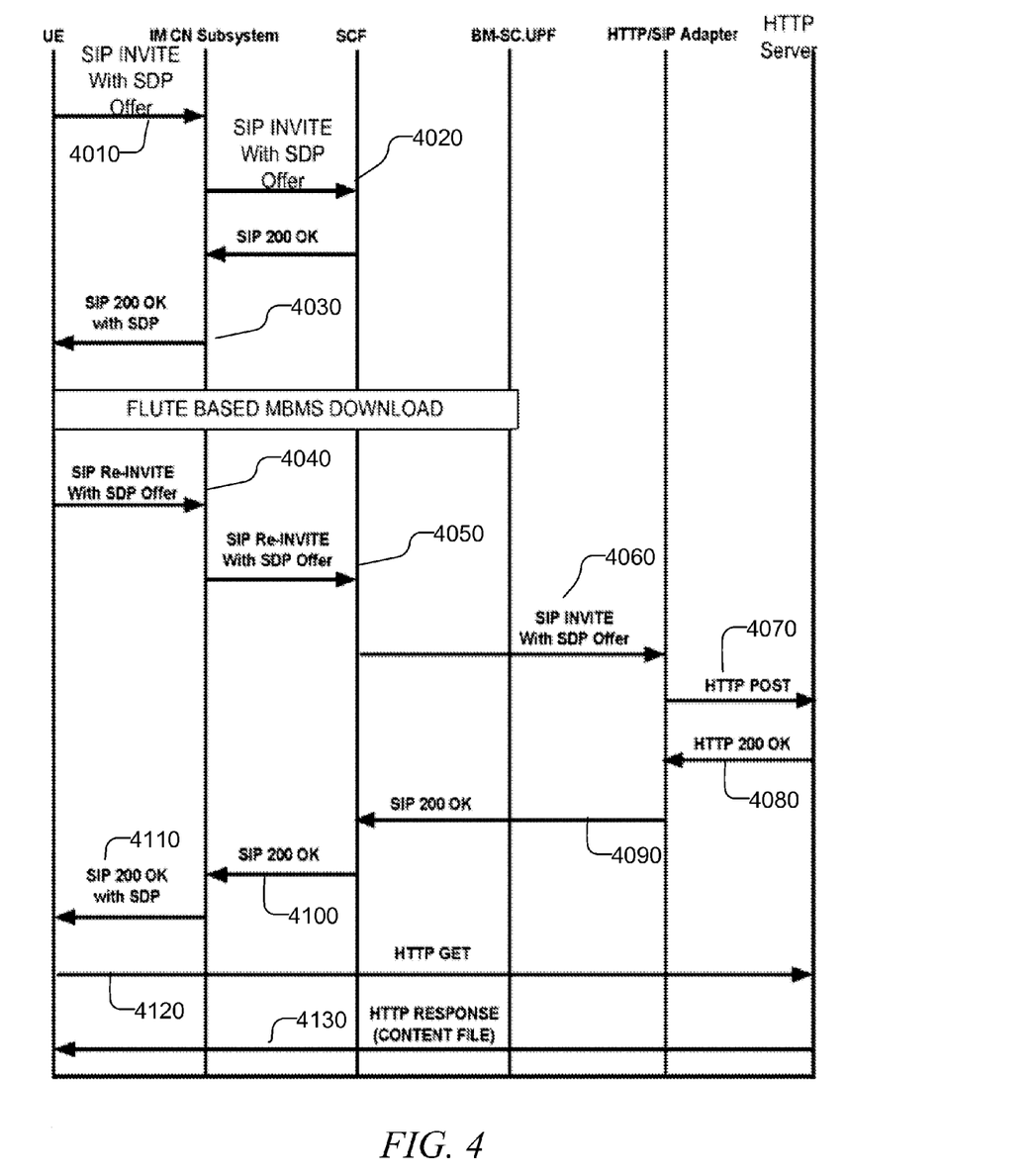
FIG. 4 shows an example message sequence chart of an IMS-based method of using an HTTP server to repair a file delivered over an MBMS bearer according to some examples of the present disclosure.

Turning now to FIG. 4, an example message sequence chart diagramming an MBMS file repair using HTTP is shown. At operation 4010, the UE generates an initial SIP INVITE message and sends it to the IM CN Subsystem, indicating the chosen MBMS Download Service. A SDP offer may be included in the SIP INVITE message. The IM CN Subsystem forwards the SIP INVITE message and SDP offer to the SCF. The Request-URI in the SIP INVITE request may be the well known PSI (Public Service Identifier) of the MBMS Download Service, the "to" header may contain the same URI as in the Request-URI, and the "from" header may indicate the public user identity of the user. An SDP offer may be included in the request and may be done in accordance with the parameters received during UE service selection procedure and with media capabilities and required bandwidth available for the MBMS download service.

At operation 4020, upon receipt of a SIP INVITE request, the SCF examines the SDP parameters in the SDP offer and performs service authorization procedures to check the service rights of the requested MBMS download service according to the user subscription information. If the user is authorized, the SCF may answer with a SIP 200 OK including the SDP answer. The SDP answer may contain the fdt_address: uri to indicate the address of the File Delivery Table (FDT) and the repair-server-address:uri to indicate the address of the repair server.

At operation 4030, upon receipt of the SIP response, the UE may examine the FLUTE session parameters in the received SDP, and receive the MBMS download data accordingly. In case the FDT is unavailable, the UE may get the FDT according to fdt_address attribute in the SDP Answer. The FDT contains content description information for the files delivered in the FLUTE session.

In case of incomplete download, the UE may execute the file repair procedures towards the repair server indicated by repair-server-address attribute in the SDP Answer from the SCF. In order to switch from MBMS download to HTTP-based delivery of the repair service from the web server, a session initiation protocol (SIP) Re-INVITE is issued by the UE and sent to the IM CN subsystem at operation 4040. A session description protocol (SDP) offer and Request-URI pointed to the repair server may be included in the SIP Re-INVITE message to activate the file repair. The IM CN subsystem may forward the SIP Re-INVITE message to the SCF. The Request-URI is related to the HTTP-based file repair session from the web server that the user wishes to activate. The Request-URI may be composed of a user and domain part as defined as follows: The user part contains the content identifier, retrieved from user service description information from SSF. The content identifier may be retrieved from service selection information. The domain part is the Service Provider domain name, obtained from SSF. The 'to' header may contain the repair server address URI. The 'from' header may indicate the public user identity of the user. The content identifier can be retrieved from the service selection information. An SDP offer may be included in the Re-INVITE request, in accordance with media capabilities and policies available for the file repair session and with the parameters received from the SSF during service selection procedure or during the procedure for retrieving missing parameters by SIP OPTIONS.

At operation 4050, responsive to receiving the SIP modification request, the SCF may determine if the program currently broadcasted has MBMS/FLUTE to HTTP switching support for file repair purposes. If MBMS to HTTP switching is not available for the UE, the session modification is rejected and the old MBMS session (along with the previous reserved resources) is maintained. If MBMS to HTTP switching is available for the UE, the SCF acting as a B2BUA, may check the user rights for the requested content upon reception of the SIP Re-INVITE message from the UE, identify that the request is for MBMS file repair procedures, select an HTTP/SIP adapter and forward the SIP INVITE request to the HTTP/SIP adapter which is in charge of the file repair service by changing the "Request-URI" accordingly. When receiving a 301 or 302 response from the HTTP/SIP adapter, the SCF may not forward this message to the UE.

If the Request-URI contains a content identifier in the user part and a domain name in the domain part, the SCF may select a suitable HTTP/SIP adapter and generate a SIP INVITE request to the selected HTTP/SIP adapter. The 'to' header of the SIP INVITE request may contain the same content identifier as in the Request-URI of the SIP modification request received from the UE. At operation 4060, the SCF may send the SIP INVITE request to the HTTP/SIP Adapter with the SDP parameters and may tear down the FLUTE-based MBMS download session between the BMS-C.UPF and UE.

Upon reception of the MBMS file repair activation request, the HTTP/SIP adapter may examine the content identifier present in the user-part of the 'to' header and the media parameters in the SDP and select an HTTP Server according to the Request URI. The HTTP/SIP adapter sends an HTTP POST message to the HTTP server at operation 4070, including the IP address of the UE. The HTTP/SIP adapter may decide to redirect the request to another HTTP/SIP adapter server. In this case the HTTP/SIP adapter may return a 301 response if the content is not managed by this HTTP/SIP adapter or a 302 response for any other reasons (e.g. load balancing). The redirecting HTTP/SIP adapter may indicate one or more destination HTTP/SIP adapter addresses in the contact header.

At operation 4080, upon reception of the HTTP POST message received from the HTTP/SIP adapter, the HTTP server may answer to the HTTP/SIP adapter with an HTTP 200 OK response. The HTTP/SIP adapter returns the SIP 200 OK message to the SCF at operation 4090, including the SDP answer. The SDP answer may describe the MBMS file repair session including a download URL of the requested content file. The differences with the SDP answer defined for streaming is the absence of media line corresponding to the control protocol (Real Time Streaming Protocol (RTSP)), the indication of TCP transport and HTTP-based download method instead of streaming, and the indication of an HTTP URL instead of an RTSP URI. If the content that the user has selected cannot be found, the HTTP/SIP adapter may reply with an appropriate SIP error code (e.g., 404 Not Found) response.

At operation 4100, the SCF may forward the SIP 200 OK to the IM CN subsystem. The IM CN subsystem may forward the SIP 200 OK to the UE at operation 4110.

At operation 4120, after receiving the SIP 200 OK, the UE may leave the multicast channel and start the MBMS file repair by sending an HTTP GET (or HTTP partial GET for byte range requests) request to the URL obtained from the SIP 200 OK message. The HTTP server may deliver the content file in the HTTP response to the UE at operation 4130.

Figure 5:
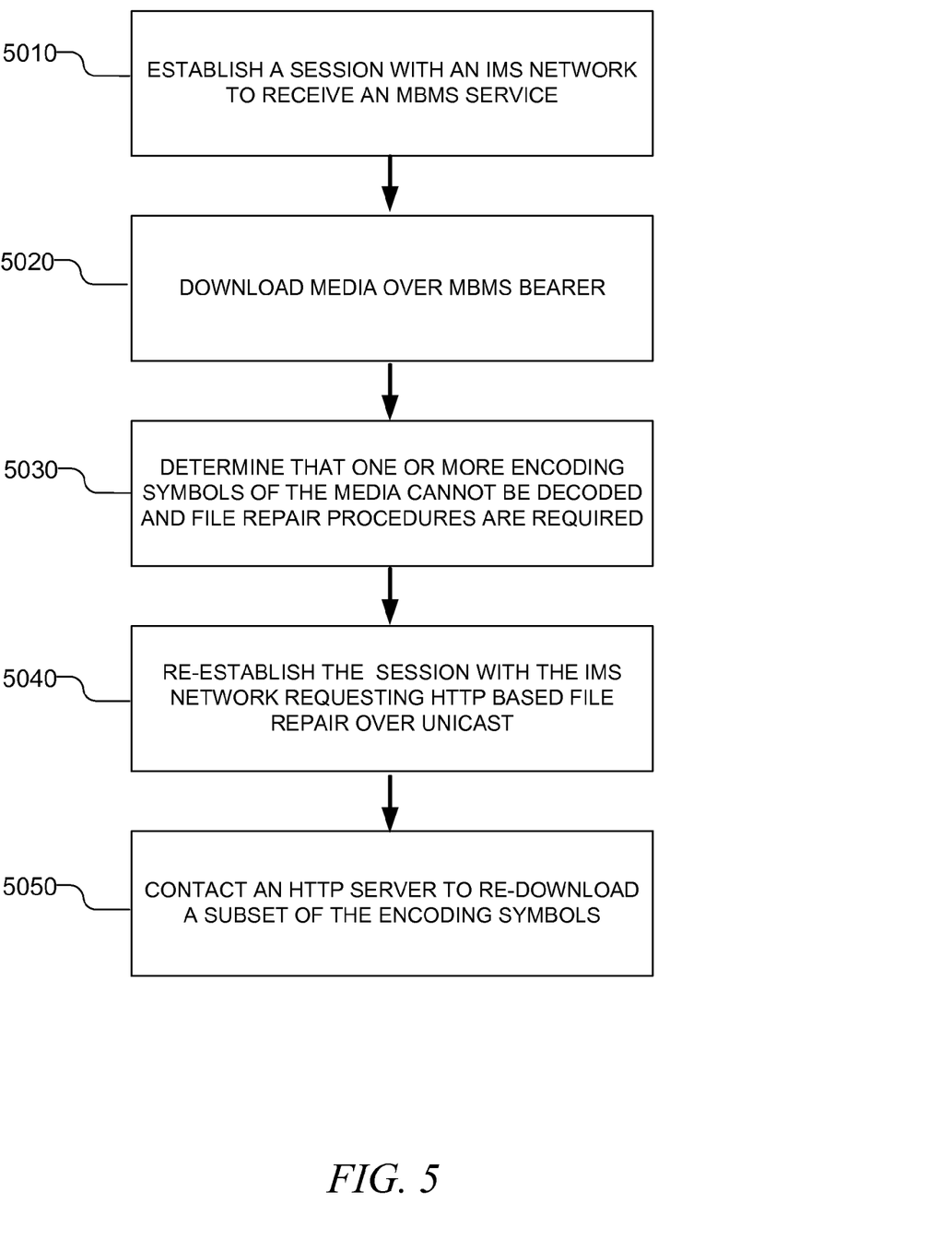
FIG. 5 shows a flowchart of an IMS-based method from the perspective of a UE of using an HTTP server to repair a file delivered over an MBMS bearer according to some examples of the present disclosure.

FIG. 5 shows a flowchart of an IMS-based MBMS file repair method utilizing an HTTP server according to some examples. At operation 5010 the UE establishes a session with an IMS network to receive an MBMS service. In some examples the UE may send a SIP invite with an SDP offer message to an IM CN subsystem. The IM CN subsystem may then forward the SIP invite with the SDP offer to the SCF. The SCF may then send a SIP OK message to the IM CN subsystem, the IM CN Subsystem may then forward the SIP OK to the UE, thus establishing the session with the IMS network to receive the MBMS service.

At operation 5020, the UE then receives the media over the MBMS bearers. In some examples, the UE communicates with the network (and receives the media) through a Long Term Evolution wireless network consistent with a $3^{rd}$ Generation Partnership Project (3GPP) family of standards. In other examples, the UE communicates with the network (and receives the media) through a Universal Mobile Telecommunications System (UMTS) wireless network consistent with a 3GPP family of standards. In still other examples, other types of wireless networks may be used.

At operation 5030, the UE determines that one or more of the encoded symbols cannot be properly decoded and hence file repair procedures are required. At operation 5040, in order to have the symbols re-sent (and thus repair the media), the UE may re-establish the session with the IMS network requesting HTTP-based file repair over unicast. In some examples, the UE may do this by sending a SIP Re-Invite request with an SDP offer to an IM CN subsystem. The IM CN subsystem may forward this to a SCF component. The SCF component may then setup a SIP to HTTP adapter which may contact a designated HTTP repair server. If the HTTP repair server replies affirmatively, the IMS network replies to the mobile that the session is properly setup.

At operation 5050 the UE then contacts the HTTP server and re-downloads the proper symbols using the information in the reply message sent from the IMS network.

Figure 6:
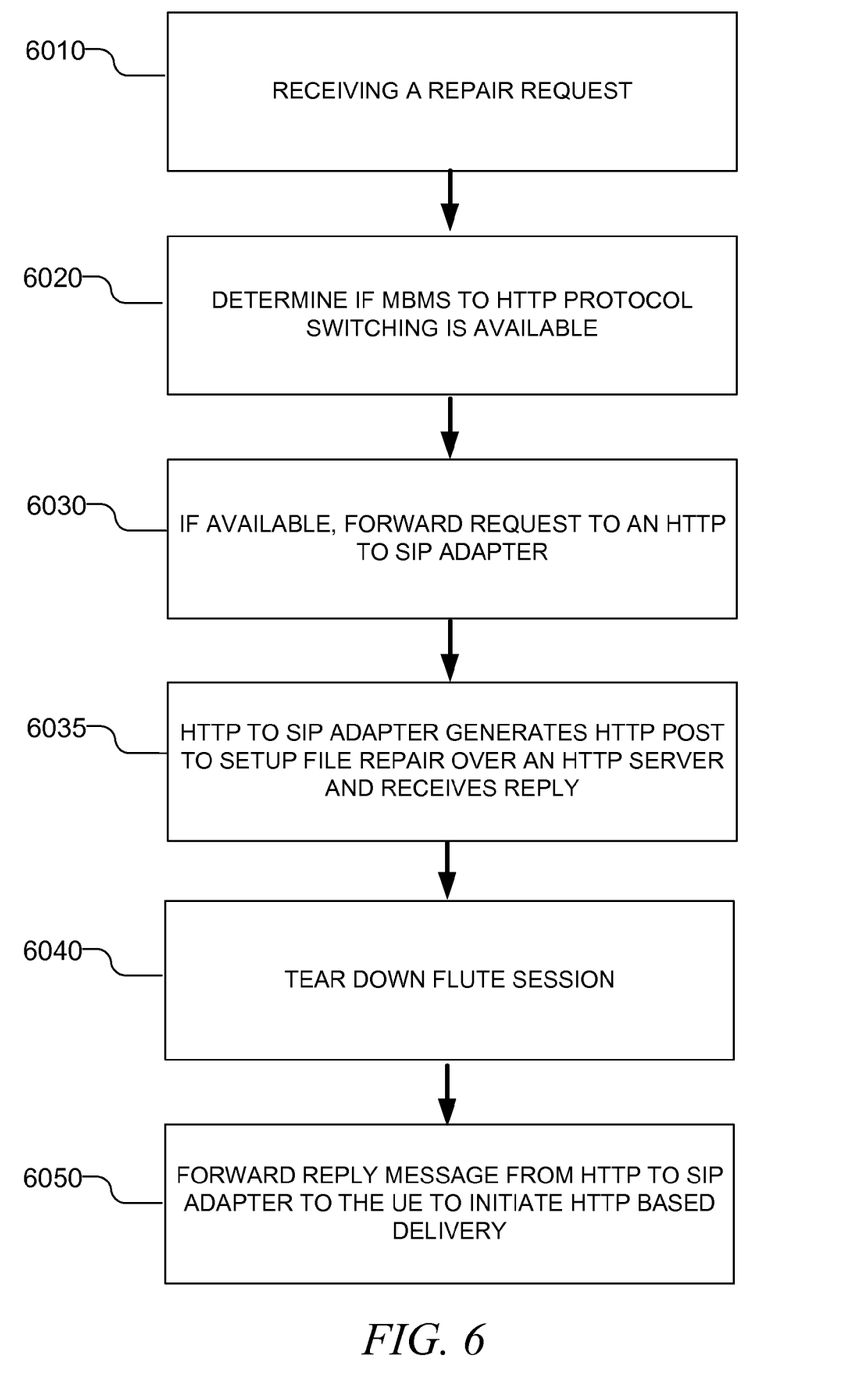
FIG. 6 shows a flowchart of an IMS-based method from the perspective of an MBMS network of using an HTTP server to repair a file delivered over an MBMS bearer according to some examples of the present disclosure.

Turning now to FIG. 6, a flowchart of a file repair method utilizing an HTTP server from an IMS network perspective according to some examples is shown. At 6010 the SCF receives a repair request from a UE. The repair request may take the form of a session re-establishment message such as a SIP re-invite with an SDP offer. The SCF determines at operation 6020 if the repair operation may be done using HTTP. If the repair operation may be done using HTTP, the request is forwarded to an HTTP to SIP adapter at operation 6030. At operation 6035, the HTTP to SIP adapter may contact the HTTP Server to setup the file repair by sending an HTTP post message. The reply message from the HTTP server is then translated into a SIP reply message by the HTTP to SIP adapter and forwarded back to the SCF. At operation 6040, the UE's FLUTE session is torn down, and at 6050 the SCF forwards the reply message from the HTTP/SIP adapter to the UE. If the reply message indicates a successful transition to an HTTP session, then the UE may download the file over HTTP, in some examples by using the information (e.g., a Uniform Resource Locator (URL)) included in the reply.

In some examples, the term IMS network is used for convenience and generally refers to any component used to deliver IMS-based MBMS services and may include certain elements of the core network (e.g., an evolved packet core network—EPC).

Figure 7:
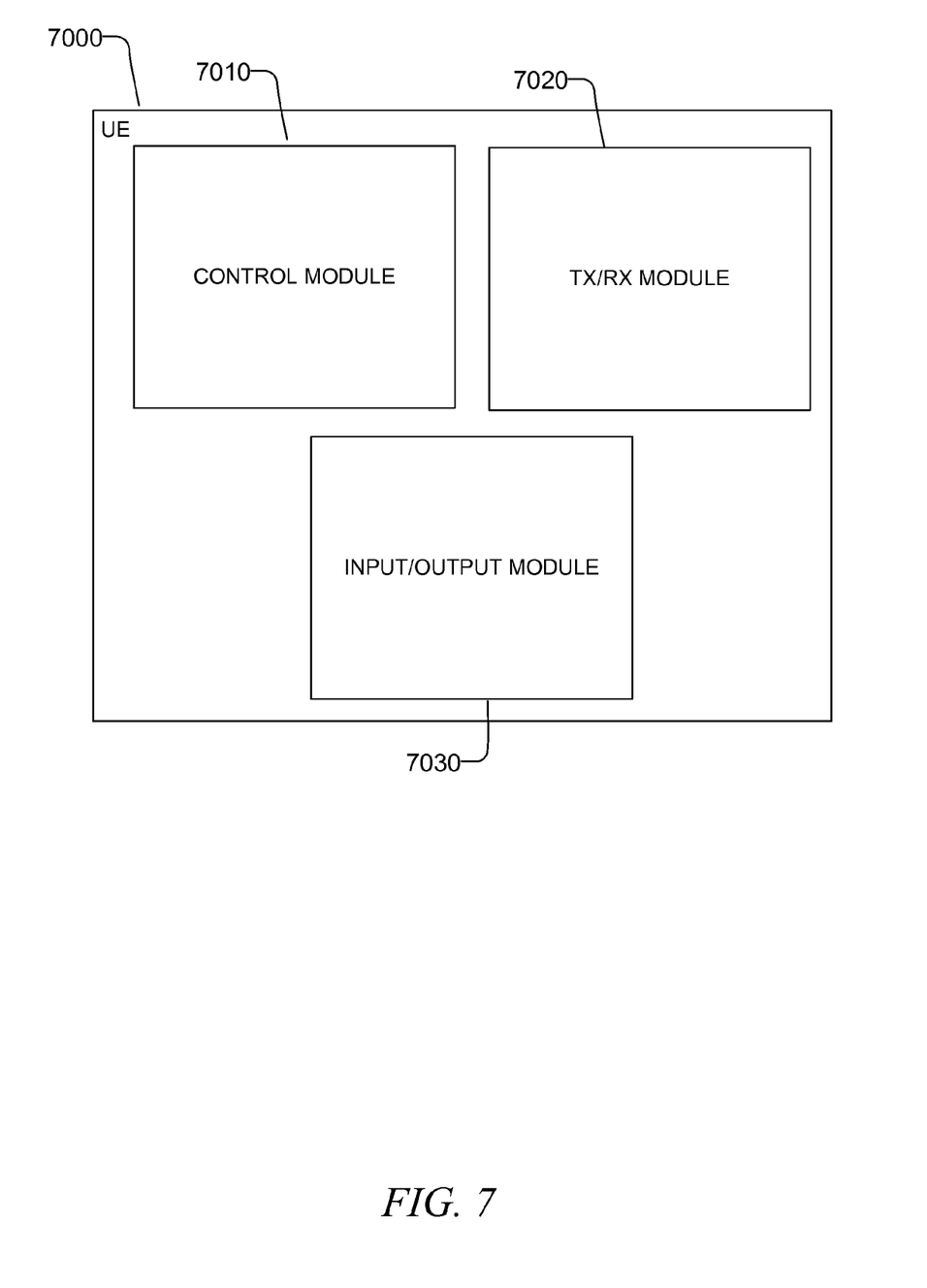
FIG. 7 shows a block diagram of certain components of a UE according to some examples of the present disclosure.

FIG. 7 shows an example of a block diagram of a user equipment device (UE) 7000 according to some examples of the present disclosure. UE 7000 may include (in addition to other modules and/or functionality) an input and/or output module 7030 which receives input from the user, for example, through a touch sensitive display interface, a keyboard, a track ball, a mouse, or the like. Input and/or output module 7030 also displays output to the user by controlling one or more graphical displays, an audio reproduction device (e.g., a speaker), or the like. Input and/or output module 7030 may display media, files, or other data received from the IMS network and may receive input from the user of the UE 7000 on which content available at the IMS network to receive.

UE 7000 may have a TX/RX module 7020 which may implement the wireless physical layer functions including modulation, coding, transmission, reception, demodulation and unencoding. The UE may also have a control module 7010 which may implement other layers of the wireless protocol stack (e.g., Layer 2 and Layer 3). For example, the control module 7010 may register for, de-register for, and receive data from the IMS network. Control module 7010 may also control the file repair procedures, including contacting an HTTP server to repair the media or files. The control module 7010 may also respond to user input from the input/output module 7030 and cause output to be sent to a display or other output device through input/output module 7030.

Figure 8:
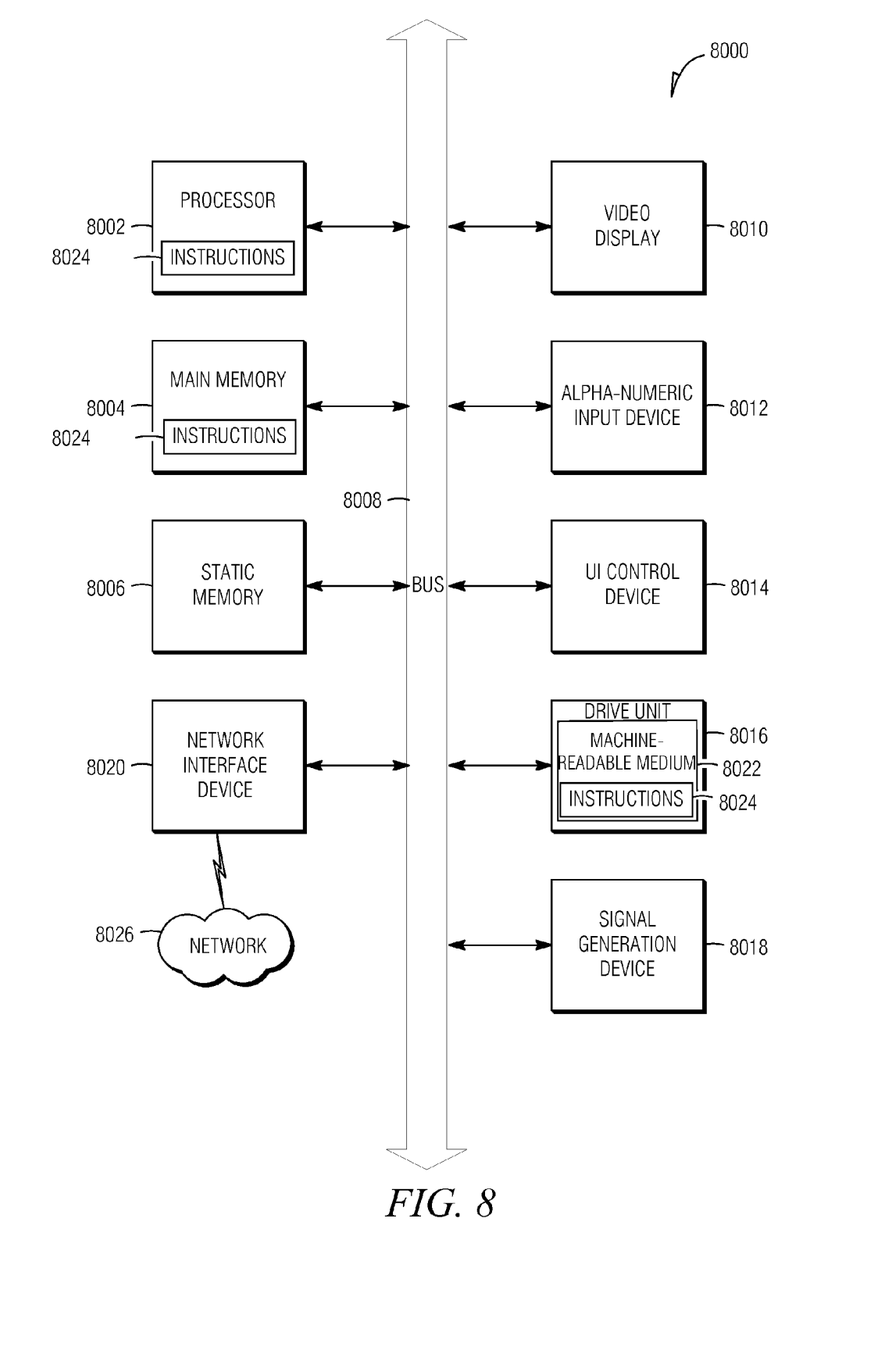
FIG. 8 shows a block diagram of a machine according to some examples of the present disclosure.

FIG. 8 illustrates a block diagram of an example machine 8000 upon which any one or more of the techniques (e.g., methodologies) discussed herein can be performed. In alternative embodiments, the machine 8000 can operate as a standalone device or can be connected (e.g., networked) to other machines. In a networked deployment, the machine 8000 can operate in the capacity of a server machine, a client machine, or both in server-client network environments. In an example, the machine 8000 can act as a peer machine in peer-to-peer (P2P) (or other distributed) network environment. The machine 8000 can be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. For example, an eNodeB, a UE, or other components of an LTE system may be, or include components of, machine 8000. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the functions of the machine 8000 can be distributed across multiple other machines in a network.

Examples, as described herein, can include, or can operate on, logic or a number of components, modules, or mechanisms. Modules are tangible entities capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as one or more modules that can change over time. Software can accordingly configure a hardware processor, for example, to constitute a particular module at one instance of time and to constitute a different module at a different instance of time.

Machine (e.g., computer system) 8000 can include a hardware processor 8002 (e.g., a central processing unit (CPU), a graphics processing unit (GPU), a hardware processor core, or any combination thereof), a main memory 8004 and a static memory 8006, some or all of which can communicate with each other via a bus 8008. The machine 8000 can further include a display unit 8010, an alphanumeric input device 8012 (e.g., a keyboard), a user interface (UI) control device 8014, and/or other input devices. In an example, the display unit 8010 and UI control device 8014 can be a touch screen display. The machine 8000 can additionally include a storage device (e.g., drive unit) 8016, a signal generation device 8018 (e.g., a speaker), and a network interface device 8020.

The storage device 8016 can include a machine-readable medium 8022 on which is stored one or more sets of data structures or instructions 8024 (e.g., software) embodying or utilized by any one or more of the techniques or functions described herein. The instructions 8024 can also reside, completely or at least partially, within the main memory 8004, within static memory 8006, or within the hardware processor 8002 during execution thereof by the machine 8000. In an example, one or any combination of the hardware processor 8002, the main memory 8004, the static memory 8006, or the storage device 8016 can constitute machine readable media.

While the machine-readable medium 8022 is illustrated as a single medium, the term "machine readable medium" can include a single medium or multiple media (e.g., a centralized or distributed database, and/or associated caches and servers) that configured or arranged to store the one or more instructions 8024.

The term "machine-readable medium" can include any tangible medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 8024 can further be transmitted or received over a communications network 8026 using a transmission medium via the network interface device 8020. Network interface device 8020 may connect the machine 8000 to a network of other machines in order to communicate with the other machines in the network by utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 8020 can include one or more physical jacks (e.g., Ethernet, coaxial, or phone jacks) or one or more antennas to connect to the communications network 8026. In an example, the network interface device 8020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 8000, and includes digital or analog communications signals or other intangible medium to facilitate communication of such software.

OTHER NOTES AND EXAMPLES

Example 1

A method of media repair in an Internet Protocol Multimedia Subsystem (IMS) based network, the method including communicating with an IMS network component using a Session Initiation Protocol (SIP) to setup a download session with a Broadcast-Multicast Service Center (BMSC) over a Multi Media Broadcast Multicast Service (MBMS) bearer; responsive to determining that one or more encoding symbols of media downloaded using the established MBMS bearer cannot be decoded: requesting a file repair procedure from the IMS network component using a SIP re-invite request, the SIP re-invite request including an address of an HyperText Transfer Protocol (HTTP) repair server indicated by the IMS network component during the MBMS bearer setup; responsive to receiving a SIP acknowledgement indicating that the request was successful, requesting an HTTP connection with the HTTP server to re-download the one or more encoding symbols of the media that could not be decoded; and receiving the one or more encoding symbols from the HTTP server.

Example 2

The method of example 1, wherein the media is downloaded using the MBMS bearer by utilizing File Delivery over Unidirectional Transport (FLUTE) protocol.

Example 3

The method of any one of examples 1-2, wherein the component of the IMS network is a Service Coordination Function (SCF).

Example 4

The method of any one of examples 1-3, wherein the HTTP connection is requested using an HTTP GET request.

Example 5

The method of any one of examples 1-4, wherein communicating with a component of the IMS network includes communicating over a Long Term Evolution (LTE) network.

Example 6

A user equipment (UE) with a control module configured to determine that one or more encoding symbols of a media file, downloaded using a Multimedia Broadcast Multicast Service (MBMS) bearer from a component of an Internet Protocol Multimedia Subsystem (IMS) network, cannot be decoded and a file repair procedure is required; and a transmission and reception module configured to: request the file repair procedure from the component of the IMS network using a Session Initiation Protocol (SIP) re-invite request responsive to the control module determining that the file repair procedure is required; request a Hypertext Transfer Protocol (HTTP) connection with the HTTP server to re-download the one or more encoding symbols of the media that could not be decoded responsive to receiving a SIP acknowledgement indicating that the re-invite request was successful; and receive the one or more encoding symbols from the HTTP server.

Example 7

The UE of example 6, comprising setting up the MBMS bearer using SIP.

Example 8

The UE of any one of examples 5-6, wherein the SIP re-invite request includes an address of an HTTP server indicated by the component of the IMS network as a file repair server during the MBMS bearer setup Example 9

The UE of any one of examples 6-8, wherein the transmission and reception module is configured to download the media using the MBMS bearer by utilizing File Delivery over Unidirectional Transport (FLUTE) protocol.

Example 10

The UE of any one of examples 6-9, wherein the component of the IMS network is a Service Coordination Function (SCF).

Example 11

The UE of any one of examples 6-10, wherein the transmission and reception module communicates with a component of the IMS network over a Long Term Evolution (LTE) network.

Example 12

A machine-readable medium that stores instructions which when performed by a machine, cause the machine to perform operations including: communicating with an Internet Protocol Multimedia Subsystem (IMS) network component using a Session Initiation Protocol (SIP) to setup a download session with a Broadcast-Multicast Service Center (BMSC) over a Multi Media Broadcast Multicast Service (MBMS) bearer; responsive to determining that one or more encoding symbols of media downloaded using the established MBMS bearer cannot be decoded: requesting a file repair procedure from the IMS network component using a SIP re-invite request, the SIP re-invite request including an address of an HyperText Transfer Protocol (HTTP) repair server indicated by the IMS network component during the MBMS bearer setup; responsive to receiving a SIP acknowledgement indicating that the request was successful, requesting an HTTP connection with the HTTP server to re-download the one or more encoding symbols of the media that could not be decoded; and receiving the one or more encoding symbols from the HTTP server.

Example 13

The machine-readable medium of example 12, wherein the media is downloaded using the MBMS bearer by utilizing File Delivery over Unidirectional Transport (FLUTE) protocol.

Example 14

The machine-readable medium of any one of examples 12-13, wherein the component of the IMS network is a Service Coordination Function (SCF).

Example 15

The machine-readable medium of any one of examples 12-14, wherein the HTTP connection is requested using an HTTP GET request.

Example 16

The machine-readable medium of any one of examples 12-15 wherein communicating with a component of the IMS network includes communicating over a Long Term Evolution (LTE) network.

Example 17

A method of file repair in an Internet Protocol Multimedia Subsystem (IMS) network the method including: receiving a Session Initiation Protocol (SIP) re-invite request from a User Equipment (UE), the re-invite requesting initiation of a file repair procedure using a HyperText Transfer Protocol (HTTP) unicast bearer and including an address of a repair server; selecting an HTTP to SIP adapter and generating a SIP invite request to the selected HTTP to SIP adapter; responsive to receiving a SIP acknowledgement message from the selected HTTP to SIP adapter indicating that the HTTP to SIP adapter has setup the file repair procedure with the repair server, tearing down a MBMS download session between the UE and a Broadcast-Multicast Service Center user plane function (BMSC.UPF) and forwarding the acknowledgement to the UE to initiate HTTP based delivery.

Example 18

The method of example 17, comprising setting up a MBMS bearer to the UE, wherein the setup includes sending the address of the HTTP repair server.

Example 19

The method of any one of examples 17-18, wherein the method is executed on a Service Coordination Function.

Example 20

The method of any one of examples 17-19, wherein the SIP invite request to the selected HTTP to SIP adapter is generated responsive to determining that the media item identified in the request allows MBMS to HTTP protocol switching.

Example 21

The method of any one of examples 17-20, wherein the SIP invite request to the selected HTTP to SIP adapter includes a session description protocol (SDP) offer and a request Uniform Resource Identifier (URI) pointed to the repair server.

Example 22

The method of example 21, wherein the request URI includes a user part comprising a content identifier and a domain part including a service provider domain name.

Example 23

A component of an Internet Protocol Multimedia Subsystem (IMS) network including: a service coordination function (SCF), operating on a computer processor and configured to: establish a Multi Media Broadcast Multicast Service (MBMS) bearer using a Session Initiation Protocol (SIP) with a user equipment (UE) to provide an MBMS service; receive a SIP re-invite request from the UE requesting initiation of a file repair procedure using a HyperText Transfer Protocol (HTTP) unicast bearer; select an HTTP to SIP adapter and generate a SIP invite request to the selected HTTP to SIP adapter; tear down the MBMS download session between the UE and a Broadcast-Multicast Service Center user plane function (BMSC.UPF) and forward the acknowledgement to the UE to initiate HTTP based delivery responsive to receiving a SIP acknowledgement message from the HTTP to SIP adapter.

Example 24

The component of the IMS network of example 23, wherein the SCF is configured to send the address of the HTTP repair server upon establishing the MBMS bearer.

Example 25

The component of the IMS network of any one of examples 23-24, wherein the SCF is configured to generate a SIP invite request to a selected HTTP to SIP adapter responsive to determining that the media item identified in the request allows MBMS to HTTP protocol switching.

Example 26

The component of the IMS network of any one of examples 23-25, wherein the SIP invite request to the selected HTTP to SIP adapter includes a session description protocol (SDP) offer and a request Uniform Resource Identifier (URI) pointed to the repair server.

Example 27

The component of the IMS network of example 26, wherein the request URI includes a user part comprising a content identifier and a domain part including a service provider domain name.

Example 28

A machine-readable medium that stores instructions which when performed by a machine, cause the machine to perform operations comprising: receiving a Session Initiation Protocol (SIP) re-invite request from a User Equipment (UE), the re-invite request requesting initiation of a file repair procedure using a HyperText Transfer Protocol (HTTP) unicast bearer, the request including an address of a repair server; selecting an HTTP to SIP adapter and generating a SIP invite request to the selected HTTP to a SIP adapter; responsive to receiving a SIP acknowledgement message from the HTTP to the SIP adapter indicating that the HTTP to SIP adapter has setup the file repair procedure with the repair server, tearing down a Multi Media Broadcast Multicast Service (MBMS) download session between the UE and a Broadcast-Multicast Service Center user plane function (BMSC.UPF) and forwarding the acknowledgement to the UE to initiate HTTP based delivery.

Example 29

The machine-readable medium of example 28, wherein the instructions include instructions which when performed by the machine, cause the machine to perform the operations of setting up a MBMS bearer to the UE, wherein the setup includes sending the address of the HTTP repair server.

Example 30

The machine-readable medium of any one of examples 28-29, wherein the instructions include instructions which when performed by the machine, cause the machine to perform the operations of generating a SIP invite request to the selected HTTP to SIP adapter responsive to determining that the media item identified in the request allows MBMS to HTTP protocol switching.

Example 31

The machine-readable medium of any one of examples 28-30, wherein the SIP invite request to the selected HTTP to SIP adapter includes a session description protocol (SDP) offer and a request Uniform Resource Identifier (URI) pointed to the repair server.

Example 32

The machine-readable medium of example 31, wherein the request URI includes a user part comprising a content identifier and a domain part including a service provider domain name.

The above detailed description includes references to the accompanying drawings, which form a part of the detailed description. The drawings show, by way of illustration, specific embodiments which can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A user equipment (UE) comprising:
    a control module configured to determine that one or more encoding symbols of a media file, downloaded using a Multimedia Broadcast Multicast Service (MBMS) bearer from a component of an Internet Protocol Multimedia Subsystem (IMS) network, cannot be decoded and a file repair procedure is required; and
    a transmission and reception module configured to:
        request the file repair procedure from the component of the IMS network using a Session Initiation Protocol (SIP) re-invite request responsive to the control module determining that the file repair procedure is required;
        request a Hypertext Transfer Protocol (HTTP) connection with an HTTP server to re-download the one or more encoding symbols of the media file that could not be decoded responsive to receiving a SIP acknowledgement indicating that the re-invite request was successful; and
        receive the one or more encoding symbols from the HTTP server.

2. The UE of claim 1, wherein the transmission and reception module is configured to set up the MBMS bearer using SIP.

3. The UE of claim 1, wherein the SIP re-invite request includes an address of an HTTP server indicated by the component of the IMS network as a file repair server during setup of the MBMS bearer.

4. The UE of claim 1, wherein the transmission and reception module is configured to download the media file using the MBMS bearer by utilizing a File Delivery over Unidirectional Transport (FLUTE) protocol.

5. The UE of claim 1, wherein the component of the IMS network is a Service Coordination Function (SCF).

6. The UE of claim 1, wherein the transmission and reception module communicates with the component of the IMS network over a Long Term Evolution (LTE) network.

7. A non-transitory machine-readable medium that stores instructions which when performed by a machine, cause the machine to perform operations comprising: communicating with an Internet Protocol Multimedia Subsystem (IMS) network component using a Session Initiation Protocol (SIP) to setup a download session with a Broadcast-Multicast Service Center (BMSC) over a Multi Media Broadcast Multicast Service (MBMS) bearer; responsive to determining that one or more encoding symbols of media downloaded using the established MBMS bearer cannot be decoded:
    requesting a file repair procedure from the IMS network component using a SIP re-invite request, the SIP re-invite request including an address of an HyperText Transfer Protocol (HTTP) repair server indicated by the IMS network component during setup of the MBMS bearer;
    responsive to receiving a SIP acknowledgement indicating that the request was successful, requesting an HTTP connection with the HTTP server to re-download the one or more encoding symbols of the media that could not be decoded; and
    receiving the one or more encoding symbols from the HTTP server.

8. The non-transitory machine-readable medium of claim 7, wherein the media is downloaded using the MBMS bearer by utilizing a File Delivery over Unidirectional Transport (FLUTE) protocol.

9. The non-transitory machine-readable medium of claim 7, wherein the IMS network component is a Service Coordination Function (SCF).

10. The non-transitory machine-readable medium of claim 7, wherein the HTTP connection is requested using an HTTP GET request.

11. The non-transitory machine-readable medium of claim 7, wherein communicating with the IMS network component includes communicating over a Long Term Evolution (LTE) network.

12. A component of an Internet Protocol Multimedia Subsystem (IMS) network comprising:
    a service coordination function (SCF), operating on a computer processor and configured to:
        establish a Multi Media Broadcast Multicast Service (MBMS) bearer using a Session Initiation Protocol (SIP) with a user equipment (UE) to provide an MBMS service;
        receive a SIP re-invite request from the UE requesting initiation of a file repair procedure using a HyperText Transfer Protocol (HTTP) unicast bearer;
        select an HTTP to SIP adapter and generate a SIP invite request to the selected HTTP to SIP adapter;
        tear down the MBMS bearer between the UE and a Broadcast-Multicast Service Center user plane function (BM-SC.UPF) and forward an acknowledgement to the UE to initiate HTTP based delivery responsive to receiving a SIP acknowledgement message from the selected HTTP to SIP adapter.

13. The component of the IMS network of claim 12, wherein the SCF is configured to send an address of an HTTP repair server upon establishing the MBMS bearer.

14. The component of the IMS network of claim 12, wherein the SCF is configured to generate a SIP invite request to the selected HTTP to SIP adapter responsive to determining that a media item identified in the SIP re-invite request allows MBMS to HTTP protocol switching.

15. The component of the IMS network of claim 12, wherein the SIP invite request to the selected HTTP to SIP adapter includes a session description protocol (SDP) offer and a request Uniform Resource Identifier (URI) pointed to a repair server.

16. The component of the IMS network of claim 15, wherein the request URI includes a user part comprising a content identifier and a domain part including a service provider domain name.

17. A non-transitory machine-readable medium that stores instructions which when performed by a machine, cause the machine to perform operations comprising:
    receiving a Session Initiation Protocol (SIP) re-invite request from a User Equipment (UE) in an Internet Protocol Multimedia Subsystem (IMS) network, the re-invite request requesting initiation of a file repair procedure using a HyperText Transfer Protocol (HTTP) unicast bearer, the request including an address of a repair server;
    selecting an HTTP to SIP adapter and generating a SIP invite request to the selected HTTP to a SIP adapter;
    responsive to receiving a SIP acknowledgement message from the HTTP to the SIP adapter indicating that the HTTP to SIP adapter has setup the file repair procedure with the repair server, tearing down a Multi Media Broadcast Multicast Service (MBMS) download session between the UE and a Broadcast-Multicast Service Center user plane function (BMSC.UPF) and forwarding an acknowledgement to the UE to initiate HTTP based delivery.

18. The non-transitory machine-readable medium of claim 17, wherein the instructions include instructions which when performed by the machine, cause the machine to perform the operations of setting up a MBMS bearer to the UE, wherein the setup includes sending an address of an HTTP repair server.

19. The non-transitory machine-readable medium of claim 17, wherein the instructions include instructions which when performed by the machine, cause the machine to perform the operations of generating a SIP invite request to the selected HTTP to SIP adapter responsive to determining that a media item identified in the SIP re-invite request allows MBMS to HTTP protocol switching.

20. The non-transitory machine-readable medium of claim 17, wherein the SIP invite request to the selected HTTP to SIP adapter includes a session description protocol (SDP) offer and a request Uniform Resource Identifier (URI) pointed to a repair server.

21. The non-transitory machine-readable medium of claim 20, wherein the request URI includes a user part comprising a content identifier and a domain part including a service provider domain name.

* * * * *